March 3, 1959  J. T. R. JENNINGS ET AL  2,875,911
FARM IMPLEMENT CARRIER
Filed Nov. 1, 1956  2 Sheets-Sheet 1
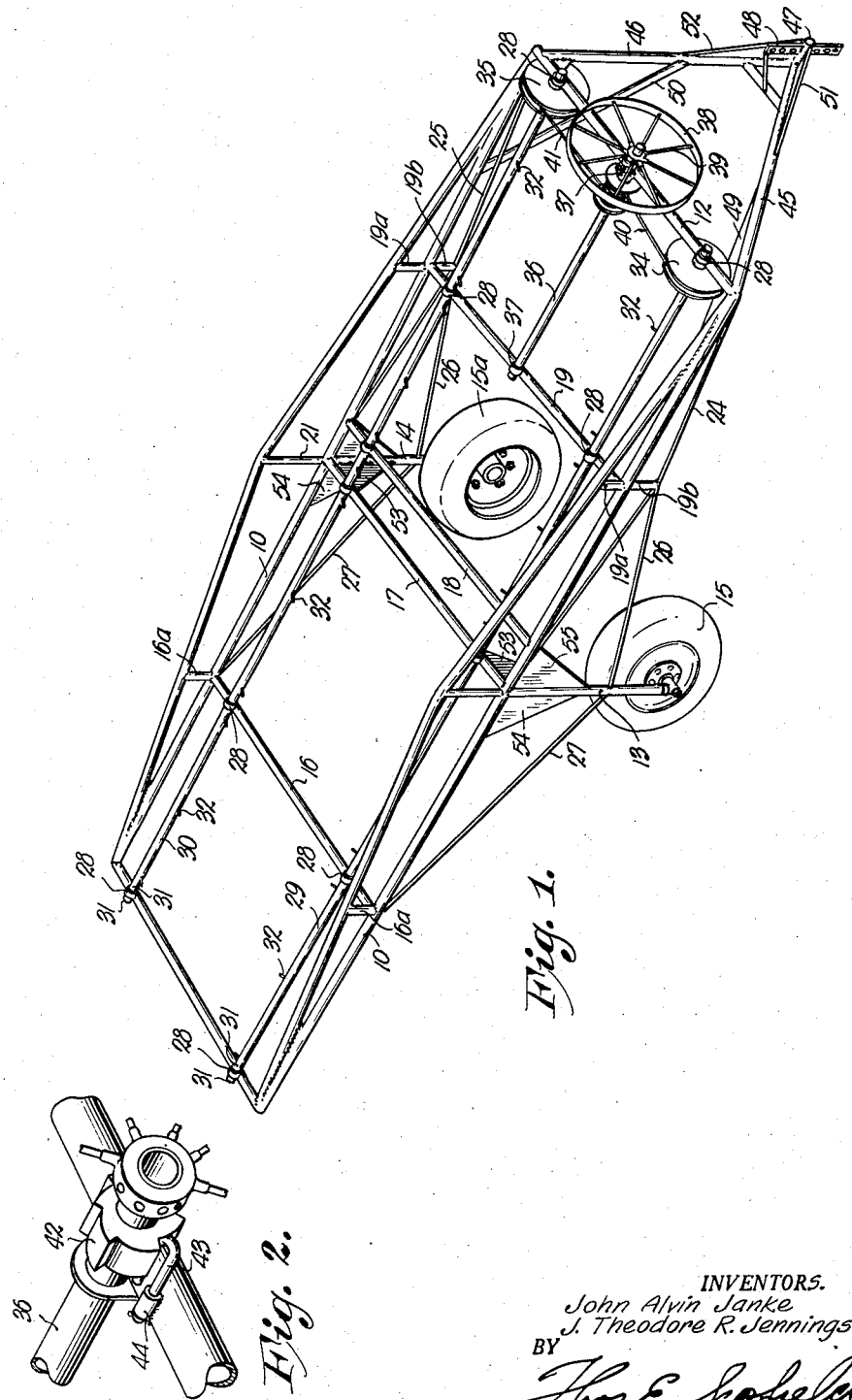
INVENTORS.
John Alvin Janke
J. Theodore R. Jennings
BY
Thos E. Scofield
ATTORNEY.

March 3, 1959  J. T. R. JENNINGS ET AL  2,875,911
FARM IMPLEMENT CARRIER
Filed Nov. 1, 1956  2 Sheets-Sheet 2

INVENTORS.
John Alvin Janke
J. Theodore R. Jennings
BY
ATTORNEY.

United States Patent Office 2,875,911
Patented Mar. 3, 1959

2,875,911

FARM IMPLEMENT CARRIER

Joseph Theodore R. Jennings and John Alvin Janke, McCracken, Kans.; Mildred G. Jennings, administratrix of the estate of said Joseph Theodore R. Jennings, deceased, assignor to said John Alvin Janke Application November 1, 1956, Serial No. 619,897

1 Claim. (Cl. 214—394)

This invention relates to farm implement and tool carriers and refers more particularly to such a farm implement carrier designed to transport safely, at high speeds and over rough roads, implements, tools and other materials of relatively great size and weight.

Previously, farm implement carriers have been provided of various types adaptable to lift and move various types of farm implements and tools. However, these conventional and previously available farm implement carriers have suffered from a number of drawbacks, to wit, lack of ability to carry the heaviest, largest and most cumbersome farm materials, tools and implements, lack of ability to carry such objects at relatively high speeds on relatively rough roads without danger to the carrier and the carrier moving device and, finally, such conventional carriers have not been able to be adjustable to the legal maximum width for use on state roads and then to a greater maximum width when not employed on width regulated thoroughfares. A primary other related objection to such conventional implement carriers lies in in the fact that the conventional carriers do not provide suspending means from the carrier which resist lateral or axial movement of the object being carried despite changes of velocity and acceleration of the carrier or vibrating motion thereof on rough roads at relatively high velocities.

Therefore, an object of the present invention is to provide a farm implement carrier having the necessary size and strength to lift the largest and most cumbersome farm implements, tools and construction materials without any difficulty while being of an exceedingly simple construction and, thus, easy to manufacture.

Another object of the invention is to provide such a farm implement carrier having lifting means fixed thereto which will easily and swiftly engage and lift objects to be transported of the most varied size, weight, bulk and form.

Another object of the invention is to provide such a farm implement carrier having such a lifting means which will suspend the object to be transported relative the implement carrier frame without motion of the object being carried relative the frame either laterally or axially of the frame despite changes of velocity and acceleration of the frame and vertical and lateral motion thereof in rough riding over unfinished roads.

Another object of the invention is to provide a farm implement carrier having a frame of the maximum width permitted on legally regulated roads, which carrier has a frame extending to the very boundaries of these limits yet with no part of the carrier, including the wheels, extending without these limits and, additionally, the carrier being adjustable so a greater width of the frame is available for suspension and moving of objects when the frame is not required to meet width requirements on roads.

Yet another object of the invention is to provide such a farm implement carrier having means to engage it with a moving device which permits engagement with the moving device at varying levels to compensate for different types of moving devices.

Another object of the invention is to provide a farm implement carrier of extreme size yet of minimum weight, the frame of the carrier being braced so as to provide an absolute maximum of strength for supporting extremely heavy and massive objects.

Another object of the invention is to provide a farm implement carrier wherein the height of the frame of the carrier is vertically adjustable within a range relative the ground to accommodate objects to be lifted and transported of varying height.

Yet another object of the invention is to provide a farm implement carrier having exceedingly simple yet positively acting and easily activated means for lifting extremely heavy and massive objects to be supported and transported.

Yet another object of the invention is to provide such a farm implement carrier which will pull easily and trail accurately behind the moving device without vibration or whip, thus permitting very high speed transport of extremely massive, cumbersome and weighty objects.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

Fig. 1 is a three-quarter top perspective view of the inventive implement carrier.

Fig. 2 is a detail view of the means for locking the carrier lifting means at any desired level.

Figure 3:
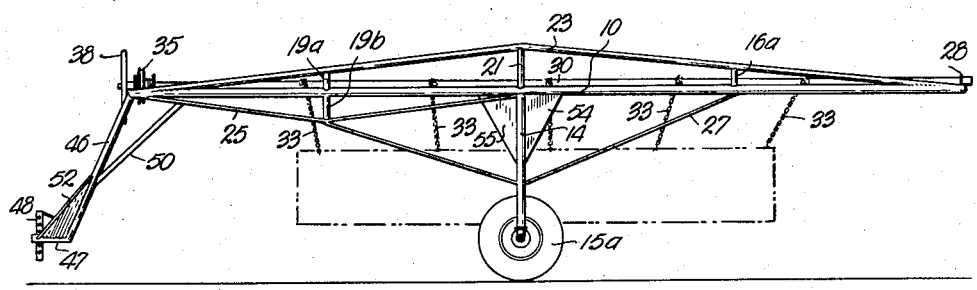
Fig. 3 is a side view of the inventive implement carrier with a suspended farm implement shown in dotted lines carried thereby.
Figure 4:
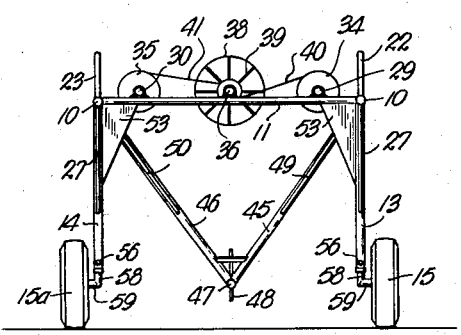
Fig. 4 is a rear view of the inventive farm implement carrier.

Referring to the drawings, the basic structure of the implement carrier comprises an oblong rectangular frame composed of a pair of axial side members 10 and transverse end members 11 and 12. The side and end members are welded or otherwise fixedly attached one to the other at the ends thereof. The width of the frame is preferably only slightly less than the legal width on state roads of the district wherein the carrier is used. The length of the axial side members 10 may be varied as desired but it is anticipated that the carrier may be 30 feet or more in length if desired. A pair of legs 13 and 14 depend rigidly from said side members 10 and preferably are positioned slightly ahead of the centers thereof. The total weight of the carrier before the wheels is to exceed that behind, but with the hitch, windup apparatus, etc., such is still the case when the wheels are slightly behind center. A pair of wheels 15 and 15a are mounted relative the lower portions of said legs in a manner to be described in detail later. A plurality of cross braces 16, 17, 18 and 19 extend transversely in spaced relationship between the side members of the frame. Cross braces 16 and 19 preferably are positioned essentially equidistant from each of the end members, with cross brace 17 extending between the tops of the legs 13 and 14 and cross brace 18 positioned essentially centrally of the ends of the side members 10. Vertical extensions 20 and 21 preferably extend upwardly from the upper ends of legs 13 and 14 and engage centrally truss members 22 and 23 which are connected by welding or other conventional means rigidly to the side members 10 at the ends thereof and for a length extending therealong. Vertical extensions 16a and 19a extend upwardly from the junctures of cross braces 16 and 19 with the side members 10 to join and reinforce the truss members 22 and 23. Downwardly extending members 19b extend downwardly from the juncture of cross brace 19 with the side members 10 and truss members 24 and 25 extend from the front ends of the side members 10 to the junction of legs 13 and 14 with the side members 10 with their apexes attached to the downwardly extending members 19b. Forward braces 26 and rear braces 27 extend from points intermediate the ends of the legs 13 and 14 to the underside of the side members 10 and the ends of the downwardly extending members 19b. The frame is thus rigidly braced and supported along all portions of its length and width and is an extremely strong and rigid structure.

Figure 5:
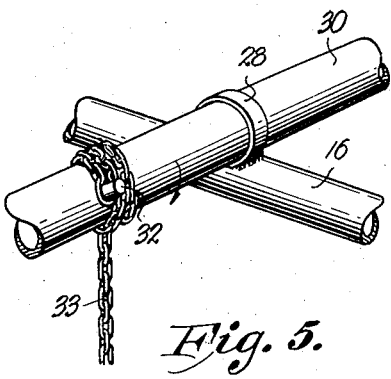
Fig. 5 is a detail showing of the attachment of one of the lifting chains to one of the elevating shafts of the implement carrier.

A plurality of bearing loops 28 are secured to the upper sides of the cross braces and end members of the frame adjacent the side members of the frame. A pair of elevator shafts 29 and 30 are journaled in said bearing loops 28 longitudinally over the upper side of said frame and cross braces substantially parallel to one another and to the side members 10 of the frame. The bearing loops 28 receive the elevator shafts along the length thereof and suitable stops 31 on each side of the rear bearing loops 28 on the rear end member prevent longitudinal motion of said elevator shafts in the bearing loops. A plurality of chain attaching means 32 are positioned between each pair of bearing loops along the length of the elevator shafts. Fig. 5 shows one of these chain attaching means positioned adjacent a bearing loop. A plurality of lifting chains 33 engaging the chain attaching means 32 extend downwardly from the elevator shafts. Any number of lifting chains may be attached to the elevator shafts as desired, one for each chain attaching means or one every other one, etc.

Means are provided at the front end of the frame for rotating the elevating shafts to wind the lifting chains thereon to lift objects attached to the free ends thereof. The preferred lifting means comprise sheaves 34 and 35 attached to the front ends of each of the elevating shafts 29 and 30, a drive shaft 36 received in bearing loops 37 centrally of the two elevator shafts and fixed to the front end member and adjacent cross brace 12 and 19, a hand operated wheel 38 fixed to the front end of the drive shaft 36 by spokes 39 and chains 40 and 41 fixed at one end to the drive shaft and at the other end to the sheaves 34 and 35 whereby rotation of the wheel 38 will wind up or unwind the chains 40 and 41 on the drive shaft 36. Fig. 2 shows locking means for the drive shaft 36 comprising a toothed wheel 42 engageable by U-shaped pin 43 journaled at one end in bearing 44, the pin 43 rotatable within its bearing to either engage one of the teeth of the wheel 42 or move out of line of the path of rotation of the teeth, the chains or cables 40 and 41 being of a greater length than the distance from the sheaves to the drive shaft.

Means are provided at the front end of the implement carrier for attaching the carrier to a prime mover or moving device. Such a moving device may be a truck, a tractor, etc. Downwardly angled arms 45 and 46 are attached at one of their ends to the juncture of the side arms 10 and front end arm 12 and at their other ends to one another. Engaging arms 47 extends horizontally and axially forward from the juncture of the arms 45 and 46 and has perforated plate 48 attached thereto and extending upwardly and downwardly therefrom to permit attachment to the moving device at varying levels. Frame braces 49 and 50 join the side members 10 and the arms 45 and 46 intermediate the ends thereof. Arm braces 51 and 52 join the arms 45 and 46 intermediate the ends thereof with the engaging arm 47 adjacent the front end thereof.

Transverse and axial triangular sheet braces 53, 54 and 55 brace the upper juncture of the legs 13 and 14 with the cross brace 17 and side members 10.

Figure 6:
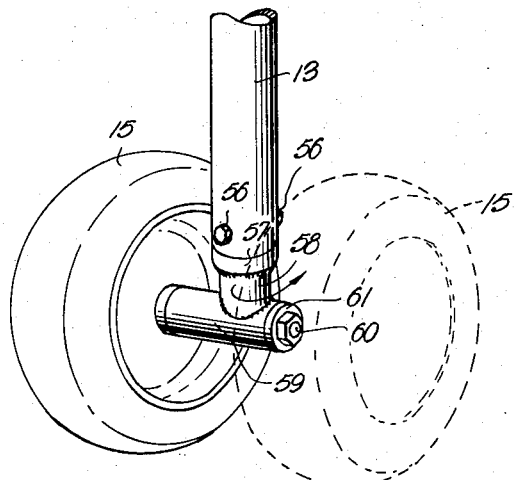
Fig. 6 is a detail view of the wheel mountings of the inventive implement carrier with the wheel shown in one position in full lines and in the reversed position in dotted lines.

Referring particularly to Fig. 6, therein is shown the construction of the wheel mountings which permits the variation in width upon reversal of the wheels. The leg 13 is preferably hollow, at least adjacent its lower end to receive the vertical shaft (not shown) of the wheel mounting. This vertical shaft has an outer diameter preferably substantially that of the inner diameter of the leg 13 whereas to slidably fit therein. Lock bolts 56 thread into holes in the hollow leg 13 to abut the outer surface of the vertical shaft and lock it in position. At the bottom of the vertical shaft is collar 57 of an outer diameter substantially that of the leg 13 whereby the lower edge of the leg rests on the upper edge of the collar when the vertical shaft is completely recessed in the leg 13. The lower portion of the vertical shaft 58 joins horizontal shaft 59 containing the axle of the wheel which is locked in the horizontal shaft 59 by end of bolt 60 engaged by lock nut 61. Wheel 15 is adjustable in two manners relative the leg 13. In the first place, it is adjustable laterally to the position shown in dotted lines in Fig. 6 by loosening the bolts 56 and swiveling the wheel around the upper portion of the vertical shaft 58 within the leg 13. In the second place, also by loosening the bolts 56, the leg 13 is vertically movable on the upper portion of the vertical shaft 58 to adjust the vertical height of the frame. The bolts 56, after any lateral or vertical adjustment of the wheel relative the leg must be tightened on the upper portion of vertical shaft 58 to fix it in place. Fig. 1 shows the wheels positioned under the frame itself to conform to the width requirements of state roads. The wheels may be reversed to increase the available lifting width of the carrier when not on legally regulated roads.

In operation, the carrier may be attached to any prime mover or moving device by an engagement which passes through one of the perforations in the plate 48. Perforations 48 permit engagement at various levels whereby to maintain the body of the frame in a substantially horizontal position. The carrier may be moved then by the prime mover to position it over the device to be lifted. Additionally, the carrier may be moved by hand over the device to be lifted if desired. Once positioned over the device, the lifting chains are attached to the chain attachment means 32 at one end with the hooks on the other end of the chains being attached at various points along the length of the device. The purpose of positioning the elevator shafts adjacent the side members 10 is to provide a suspension where the chains are inclined inwardly from each side to the device being supported whereby to stably support the device against sideways sway. Additionally, attachment should be made to the extreme front attaching means and extreme rear attaching means to provide an inclined attachment longitudinally to prevent longitudinal motion of the device to be suspended. Once the attachments have been made, as described, rotation of the wheel 38 will rotate the drive shaft and wind the cables or chains 40 and 41 upon the drive shaft from the sheaves 34 and 35. This will cause rotation of the elevator shafts and the winding up of the chains 33 upon the shafts. Considerable mechanical advantage is provided by the relative diameter of the sheaves 34 and 35 to the drive shaft 36 and the relative diameter of the wheel 38 to the drive shaft 36. Thus, the windup operation, even in the case of an extremely heavy device can be accomplished by hand. Naturally, in the course of winding up the drive shaft, the locking arm 43 is positioned out of way of the rotation of the toothed wheel 42. However, once the device has been elevated to the desired extent relative the frame, the U-arm 43 may be pushed over and engaged with the toothed wheel to lock the device in vertical suspension. The locking device requires rotation of the wheel as shown in the figures in a clockwise direction to wind up the elevator shafts to elevate the suspended device. This is because the locking wheel 42 would not lock if rotation in the other direction was provided. However, if the wheel 42 were reversed, rotation in the other direction would serve as well. The centering of the wheel supporting legs 13 and 16 only slightly forwardly of the center line of the frame causes the center of gravity of the frame to be forwardly of the wheels and, thus, the device will pull, unloaded, behind any prime mover or moving device without sway or whip at high speeds. When any device is suspended below the frame it is preferably suspended so as not to move the center of gravity behind the wheel suspension and thus cause trouble in trailing the device. To lower the suspended device, the U-arm 43 is disengaged from the toothed wheel 42 by rotating the wheel 38 slightly more in the windup direction and then the wheel 38 may be rotated in regulated fashion by hand to lower the device to the ground. As many or as few chains may be employed as desired suspended from any points on the longitudinal shafts. The provision of the longitudinal elevating shafts obviates the necessity of complicated gearing systems working more than a pair of shafts.

Thus it is seen that a carrier for farm implements and other large and heavy objects has been provided which will accomplish all of the ends and objects hereinbefore set forth. Customarily, wheelless implements have been loaded on tractors or trailers with a high possibility of injury to the loader. Such danger is obviated by this device. Also, customarily large farm machinery such as hoes and harrows are not movable on the highway because they would wear out the road, wear out the instrument and are too wide anyway. Customarily these devices must be disassembled for truck moving. All of these difficulties are obviated by this device. Especially in the wheat states, 15 in number, owners of land often possess land widely separated from their other tracts. Thus, heavy machinery employed by the land owner must be transferred on roads between these various tracts and, often, the roads are quite bad. Another use for this device is to transfer implements broken down in the field to the farmer's own repair shop and return them to the field. Suitable grease fittings of conventional type are provided in the bearing loops to maintain easy action of the elevator shafts. By employing axial elevator shafts, the friction of the suspending chains along the axial shafts aids in preventing longitudinal sway and movement which is the greatest problem in starting and stopping. This friction, combined with the angled suspension completely obviates this problem. The angled side suspension easily handles the problem of side motion and sway which is not as serious as the longitudinal motion.

This device is intended to transport, pick up and let down and handle in any way extremely large and heavy farm implements. Examples of such use include spring tooth harrows 20 feet wide, spike tooth harrows 36 feet wide, rod weeders 14 feet wide, rotary hoes 20 feet wide, tandem disks 14 feet wide, single disks 18 to 21 feet wide, grain drills 14 feet wide and one-way plows 21 feet wide. The weights of these implements vary from 1200 to 3600 pounds. Additionally, in some instances, tractors may be desired to be transported with this device, some tractors weighing in the vicinity of 4200 pounds. Thus, it is evident that there has been provided an extremely rugged, flexible device for transporting large, cumbersome and heavy implements and also other materials such as telephone poles, logs, highway culverts, etc.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

A farm implement carrier comprising a pair of spaced, parallel wheels, a strut for each wheel, the lower end of each strut being rotatably connected with its wheel and the struts extending upwardly parallel to one another, an open rectangular frame hvaing rigidly connected side and end members, the side members being of greater length than the end members and being rigidly affixed approximately centrally of their ends to the upper ends of said struts, the struts being normal to the side members so that the frame extends in opposite directions in cantilever fashion from said struts, tongue means connected with one end of said frame to provide an attachment for a prime mover, a first V-shaped truss member overlying the full length of each side member with the ends of each truss member rigidly secured to the ends of its respective side member and the apex thereof spaced above the central portion of the side member, a compression member interposed between each said apex and side member and rigidly secured thereto, a second V-shaped truss member underlying each of said side members between said struts and said one end to which the tongue is connected, the ends of said second V-shaped truss members being rigidly connected to their respective side members with the apex of each second truss member spaced below its side member, a compression member interposed between each said apex of said second truss member and side member and secured thereto, a plurality of spaced parallel cross braces extending between and rigidly connecting the side members intermediate the ends thereof, one of said braces extending between the side members approximately at the location of the last mentioned compression members, a pair of elevating and carrying shafts extending parallel with the side members and on top of said cross braces, means on said cross braces journaling said shafts for rotation about a fixed axis relative said cross braces, a plurality of flexible suspension elements connected at one end with each shaft at spaced points along the length thereof, the other ends of said suspension elements adapted for connection with an implement, means for rotating said shaft in a direction to wind said suspension elements on said shaft thereby to lift said implement free of the ground, and means operable to releasably lock said shafts against reverse rotation whereby to maintain said implement in a suspended condition beneath the frame during transit of the carrier.

References Cited in the file of this patent
UNITED STATES PATENTS

| | | |
|---|---|---|
| 2,448,119 | Peterson | Aug. 31, 1948 |
| 2,750,197 | Tripp | June 12, 1956 |

FOREIGN PATENTS

| | | |
|---|---|---|
| 548,410 | Great Britain | Oct. 8, 1942 |